Dec. 29, 1964    M. D. BLISS, JR    3,163,438
SULKY
Filed Aug. 14, 1961    2 Sheets-Sheet 1
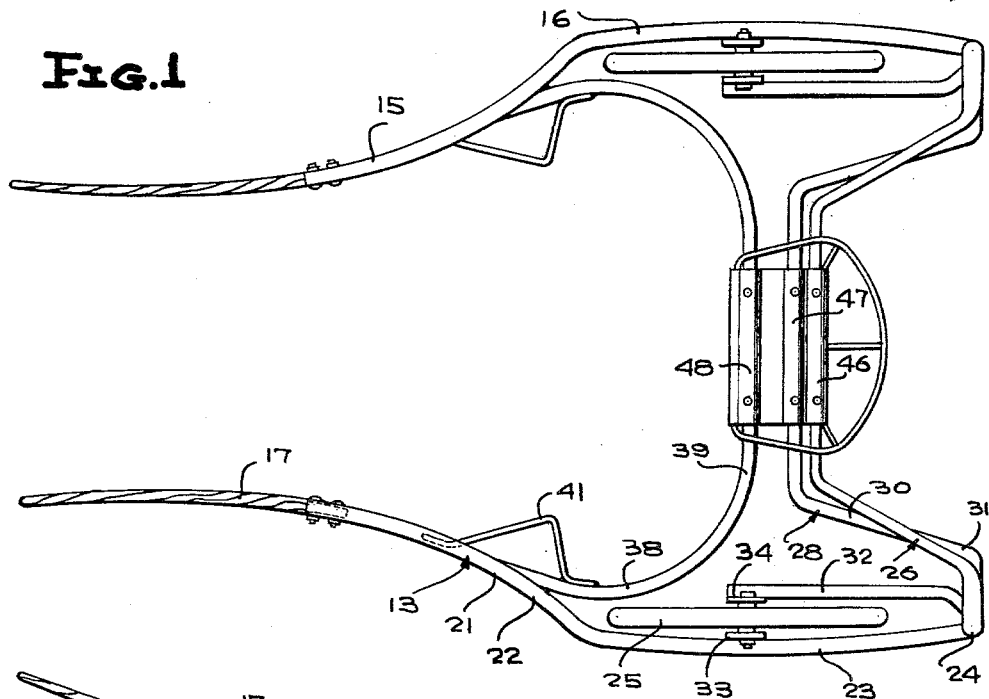
Fig.1
Fig.2
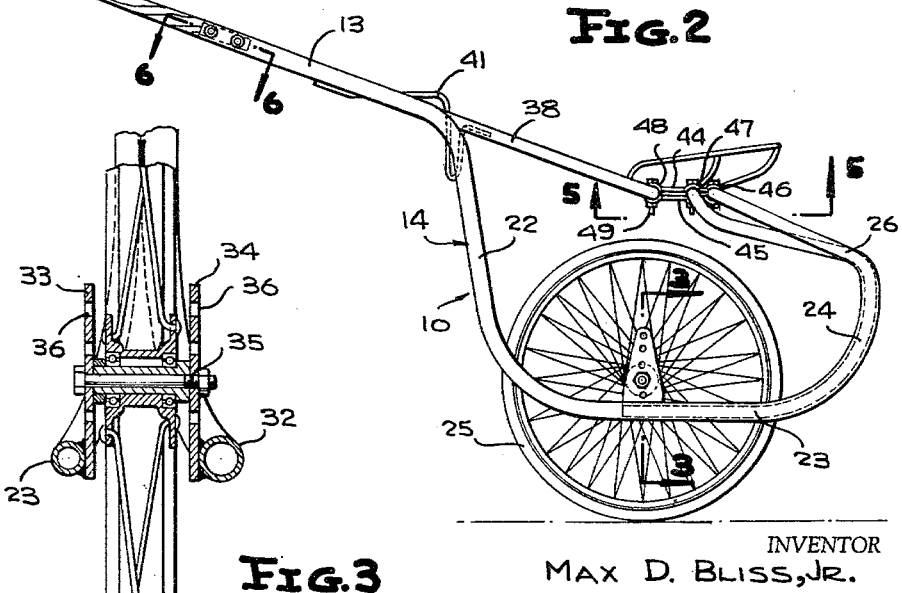
Fig.3
INVENTOR
MAX D. BLISS, JR.
BY Shoemaker and Mattare
ATTORNEYS

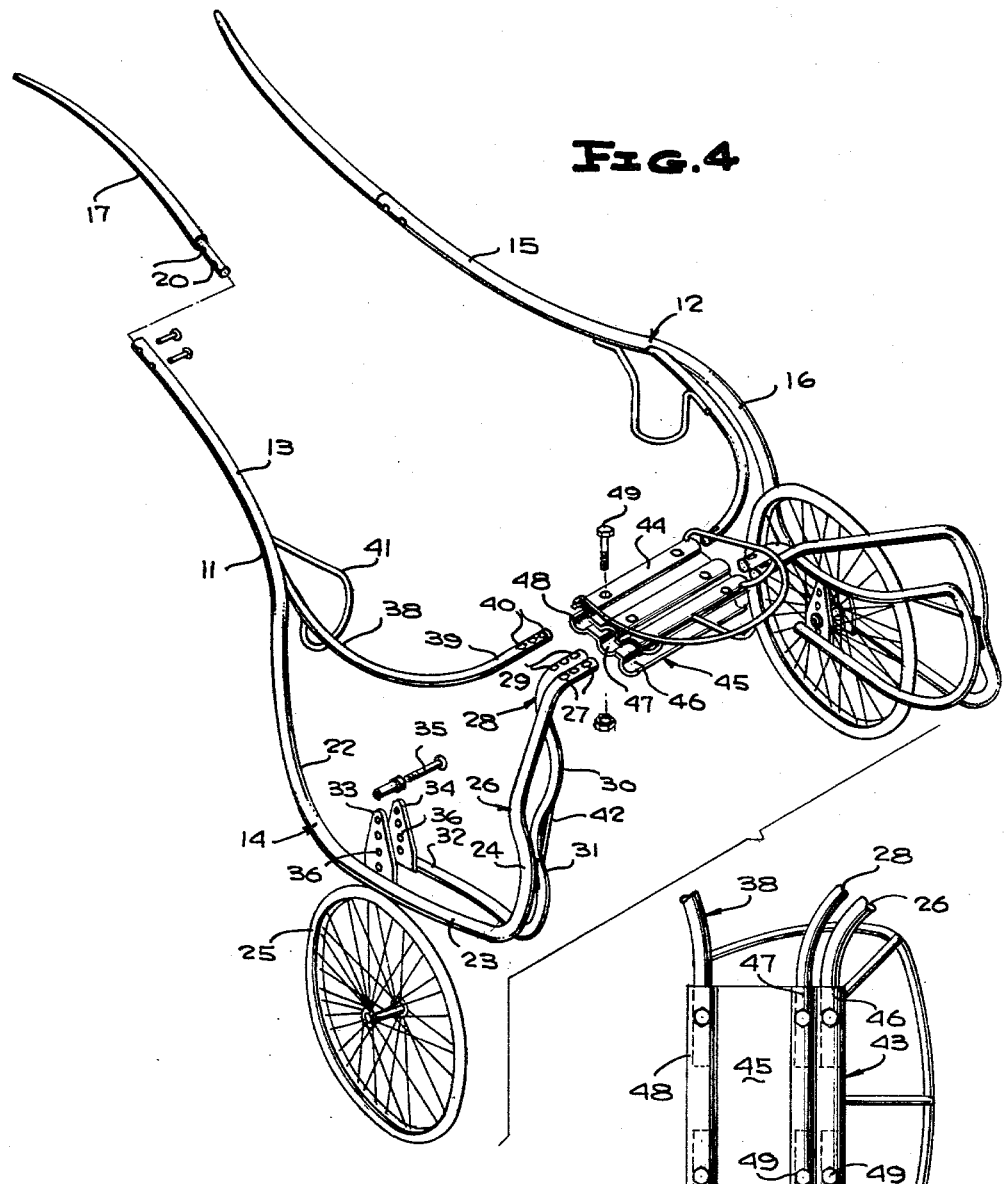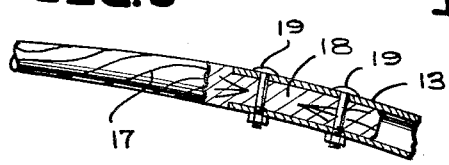

United States Patent Office 3,163,438
Patented Dec. 29, 1964

3,163,438
SULKY
Max D. Bliss, Jr., West Brattleboro, Vt.
(R.F.D. 1, East Putney, Vt.)
Filed Aug. 14, 1961, Ser. No. 131,169
6 Claims. (Cl. 280—43)

The present invention relates to a horse drawn cart and more particularly to a racing sulky.

It is an object of the present invention to provide a novel racing sulky that is adjustable to the size of the horse with which it is used.

It is another object of the present invention to provide a racing sulky that can be adjustable in width to widen or narrow the span between the shaft or thills depending upon the size of the horse.

It is another object of the present invention to provide a racing sulky that is adjustable in height to accommodate the size of the horse through means provided in the wheel connections.

It is another object of the present invention to provide a racing sulky that may be adjusted in length to accommodate the size of a horse through means provided in the shafts or thills.

It is another object of the present invention to provide a racing sulky that can be readily assembled and disassembled or collapsed so that it may be easily transported or shipped to different locations and also may be stored in a compact space.

It is another object of the present invention to provide a racing sulky in which the two main portions thereof can be disassembled from one another to form two halves.

It is another object of the present invention to provide a racing sulky that may be easily converted to a training cart for racing horses.

It is another object of the present invention to provide a racing sulky having a body or frame made of any material and which is readily repairable, and further has parts which may be readily disassembled from the rest of the structure for replacement should they be damaged, without requiring replacement of the entire assembly.

It is another object of the present invention to provide a racing sulky made primarily of a left section and a right section in which one section is detachably connected to the other section by telescoping means, the two sections being joined to each other adjacent the seat portion to evenly distribute the weight of the rider to both sections.

It is still a further object of the present invention to provide a one-piece shaft and arch with an inner brace support for the sulky wheel.

It is yet another object of the present invention to provide a sulky having wheel braces that are preset for camber and toe-in so that when the wheel rides over rough terrain, it will have vertical movement, as distingished from the side movement of the whole sulky, and further to keep the wheel in track.

Yet another object of the present invention is to provide a sulky that has a fender connected to the outside brace to entirely cover the wheel and which extends up above and over the wheel and is connected to the outside brace across and inboard of the wheel.

Another object of the present invention is to provide a sulky having a small brace at the corner of the inner brace that prevents interlocking of the wheels with other wheels of another sulky, and both braces extend far enough in back of the wheel to prevent a horse from becoming entangled or getting into the wheel.

It is another object of the present invention to provide a sulky frame in which the rear portion of the braces is positioned toward the top of the frame so a horse cannot get into the transverse space between them.

Another feature of the present invention is that the sulky can be converted into a training cart by adding a cross brace at the point of the driver's stirrups, which will include a dashboard and stirrups. The conversion also contemplates adjustment of the shafts to extend forward from their usual position and lowering of the rear of the sulky, and narrowing of the lateral opening between the shafts so that when used in training, the horse is forward of the dash so that the trainer can watch the gait, as distinguished from use when racing a horse at which time the horse is back nearer the driver's seat.

Various other objects and advantages of the present invention will be readily apparent from the following detailed description when considered in connection with the accompanying drawings forming a part thereof, and in which:

FIG. 1 is a plan view of the assembled sulky embodying the present invention;

FIG. 2 is a side elevational view of the assembled sulky;

FIG. 3 is an enlarged detail view of the wheel connection taken along line 3—3 of FIG. 2;

FIG. 4 is a perspective view of the sulky, partially disassembled, showing details of the means of adjusting the several parts;

FIG. 5 is a plan view of the driver's seat taken along lines 5—5 of FIG. 2; and

FIG. 6 is a detail view showing the forward part of the shaft connected to the rearward part thereof.

Referring to the drawings, the reference numeral 10 generally designates a sulky having a left section 11 and a right section 12 that may be readily joined to one another and just as easily disassembled or separated for storage or transporting it from one place to another. Section 11 comprises a left shaft or thill 13 which includes an arch portion 14, while section 12 includes a similar shaft 15 including a similar arch portion 16 forming the right side of the sulky.

The shaft 13 has a forward portion 17 preferably made of wood with a reduced or necked rear end portion 18 (see FIG. 6) that fits into the hollow tubular metal rear portion of the shaft 13 and is fixed thereto by bolt members 19, passing through spaced openings 20 (see FIG. 4) drilled through 17 and the tubular portion. Although the connection of the forward portion 17 of the shaft to the rearward portion thereof is shown having only two spaced bolts, it is to be understood that there may be more than this number. It is also apparent that by the telescoping connection of these two parts, the shaft may be lengthened by connecting the two parts together so that only one bolt 19 connects wooden portion 17 and the tubular metal shaft portion to each other. Thus, the over-all length of the shaft may be lengthened or shortened to accommodate horses of different sizes.

The forward portion 17, when seen from side elevation (FIG. 2) is substantially straight, whereas when seen in plan (FIG. 1) it is bowed or curved outwardly toward the rear at a somewhat greater degree than at the front and blends or flows evenly into the outwardly curved tubular shaft portion 21, the rear of which is curved vertically downwardly as at 22 (FIG. 2) and thereafter horizontally as at 23 (FIG. 2), and then vertically upwardly as at 24 (FIG. 2) to form an arch for reception of the sulky wheel 25. It will be noted that the tubular portion 21 of the shaft 13 and the arch are made of a single piece and are preferably made of tubular metal.

The upper rear end 24 of the arch is turned forwardly and inwardly as at 26, and then extends in a direction transversely of the shaft 13 to form a cross brace, provided with a plurality of spaced aligned vertical openings 27 on its inner end for connecting it to the other section 12 of the sulky, as hereinafter described.

Another tubular brace 28 having spaced openings 29 on its inner end similar to openings 27 is provided forwardly and adjacent brace 26 and extends outwardly away from the seat portion, and thereafter at 30 below brace 26, and downwardly and inside portion 24 of arch 14, and at 31 downwardly and inside portion 24 of arch 14, at which point it is secured to 24 by welding or similar means. Thereafter, the brace 28 curves downwardly and forwardly to form a wheel support member 32, in spaced relationship with portion 23 of arch 14 so as to form a cradle therewith, between which is disposed the sulky wheel 25. Similar vertical wheel support plates 33 and 34 are welded to arch 14 and wheel support member 32 and are provided with a plurality of vertically spaced aligned holes 36 therein to receive a wheel axle member 35 therethrough. The provision of the spaced openings 36 in the vertical plates permits the axle and height of the wheel to be adjusted upwardly or downwardly so as to accommodate horses of different sizes. It is also to be noted that the vertical plates are so disposed that the wheel is cambered and toed-in so that the sulky wheel will always keep in track and when the wheel rides over a rough terrain or a rock, it will have vertical movement, as distinguished from side movement of the whole sulky.

A horizontal transverse cross brace 38 (see FIG. 1) is joined to portion 22 of the shaft and curves inwardly to form a forward cross brace having a transversely extending rear inner end indicated at 39, with spaced holes 40 therein for connecting it to the right section 12 of the sulky as hereinafter described. Inner end 39 is similar to the inner end of braces 26 and 28, and holes 40 are disposed therein in alignment with the holes in these two braces, and the ends are disposed in the same plane. A stirrup 41 for the foot of the driver is joined to shaft 13 and brace 38.

Looking at FIG. 2, it is clearly seen that the arch extends forwardly and rearwardly of the wheel and above the wheel so as to prevent the wheels from other sulkies from being interlocked therewith. The brace 31 is also provided with a strut 42 which prevents the wheel of another sulky from becoming interlocked in the sulky frame.

The driver's seat generally designated 43 comprises complementary split plate sections consisting of an upper plate 44 and a lower plate 45 formed with horizontal tubular configurations 46, 47 and 48 therein and held together by a series of vertical bolt members 49 which pass through the inner ends of braces 26, 28 and 38. The tubular sections 46, 47 and 48 are adapted to telescopically receive the inner ends of braces 26, 28 and 38 which are telescoped therein so that section 11 may be rigidly clamped to the seat, and the lateral distance between the shafts may be varied to accommodate different size horses. This is accomplished by sliding the braces all the way in the seat portion and securing all bolt members, or by sliding the braces into the seat so only the end hole and the bolt adjacent the inner end of the brace clamp the braces to the seat.

In connection with the right section 12 of the sulky, this section is substantially identical to the left section 11 of the sulky and the reference numerals thereof refer to like parts. It will be apparent from the drawings that the inner ends of the right braces 26, 28 and 38 are clamped to the right end of seat 43, by bolt members 49, just like the left braces.

Thus, the present invention embodies a novel sulky comprising a tubular frame structure having two main parts, each of which parts may be further disassembled into smaller components so that any of the parts may be readily replaced and the sulky completely collapsed for storage and transportation.

It is further apparent that the connection of the parts to one another enables the sulky to be changed in size so that the shaft may be made longer or shorter, so that the distance between the shafts may be increased or decreased to accommodate different size horses and further the wheels may be raised or lowered for different size horses.

The invention further provides a tubular frame that is so constructed around the wheels that it will eliminate interlocking with the wheels of another sulky during the progress of a race and has the rear transverse braces curved upwardly and inwardly so that a horse will not become entangled in the sulky during a race.

Inasmuch as various changes may be made in the form, location and relative arrangement of the several parts without departing from the essential characteristics of the invention, it will be understood that the invention is not to be limited except by the scope of the appended claims.

I claim:

1. A sulky comprising spaced shafts each including an arch extending rearwardly thereof, a cross brace extending rearwardly and inwardly of each arch, another arch forming a wheel cradle with each said first mentioned arch and having a cross brace extending generally parallel to each said first mentioned cross brace, wheel supports on said arches, axle means extending between said supports for carrying a wheel thereon, the inner ends of each pair of generally parallel cross braces spaced from each other, and seat means detachably connected to the inner ends of said cross braces, and means adjustably connecting said seat means to the inner ends of each pair of generally parallel cross braces for securing said shafts together and adjusting the distance between said shafts.

2. A sulky comprising spaced shafts each including an arch extending rearwardly thereof, a cross brace extending rearwardly and inwardly of each arch, another arch forming a wheel cradle with each said first mentioned arch and having a cross brace extending parallel to each said first mentioned cross brace, wheel supports on said arches, said means extending between said supports for carrying a wheel thereon, means on said supports for varying the height of said axle means to adjust the wheel height, seat means detachably connected to the inner ends of said cross braces, means for adjusting the distance between said shafts, said seat means comprises two complementary plates with tubular configurations therein adapted to telescopically receive the inner ends of said cross braces, and said cross braces are detachably connected to said seat by bolt members extending through said cross braces and said plates.

3. A sulky comprising spaced shafts each including a forward portion telescoped in a rear portion, and means for detachably connecting said portions together to vary the length of said shafts, an arch extending rearwardly of the rear portion of each shaft, another arch spaced inwardly of said first mentioned arch and secured thereto to form a wheel cradle, a cross brace extending inwardly of each arch at the rear thereof, another cross brace at the rear of said another arch extending parallel to said first mentioned cross brace, wheel supports on said arches, axle means extending between said supports for carrying a wheel, means for varying the height of said axle means to adjust the wheel height with respect to said arches, and seat means comprising a split plate with tubular configurations therein, the inner ends of said cross braces telescopically disposed in said tubular configurations, and means for detachably connecting said cross braces to said split plate to vary the distance between said shafts.

4. The sulky of claim 3 including a pair of horizontal cross braces, each of said horizontal cross braces having one end secured to one of said shafts and another end telescopically disposed in the forward portion of said split plate.

5. The sulky of claim 3 wherein said arches extend forwardly and rearwardly of said wheel and above said wheel, and said braces are disposed adjacent the top portion of said wheel to prevent interlocking of said wheel with other sulkies.

6. A sulky having symmetrical sides, each side comprising shaft means including a U-shaped arch extending from the rear thereof, a cross brace extending from the rear of said arch toward the other side, another arch forming a wheel cradle with said first arch and having a cross brace extending parallel to said first brace, wheel supports on said arches, the wheel support on the other arch being connected to a free end thereof, axle means extending through said supports for carrying a wheel thereon, and means connecting the braces on each side together, the means connecting said cross braces comprising a pair of generally horizontally extending plates receiving the adjacent ends of said cross braces therebetween, means securing said plates to said cross brace ends, said plates located centrally between said sides and adapted to function as a seat for the driver of said sulky.

References Cited in the file of this patent

UNITED STATES PATENTS

| | | |
|---|---|---|
| 187,693 | Wood | Feb. 20, 1877 |
| 482,471 | Cullison | Sept. 13, 1892 |
| 495,014 | Bull | Apr. 11, 1893 |
| 495,015 | Bull | Apr. 11, 1893 |
| 503,137 | Hamill | Aug. 15, 1893 |
| 525,033 | Stoddard | Aug. 28, 1894 |
| 815,841 | Lapham | Mar. 20, 1906 |
| 887,133 | Smith | May 12, 1908 |

FOREIGN PATENTS

| | | |
|---|---|---|
| 142,286 | Australia | July 17, 1951 |
| 39,541 | Norway | Aug. 18, 1924 |